United States Patent
Phadke et al.

(10) Patent No.: US 9,065,323 B2
(45) Date of Patent: Jun. 23, 2015

(54) SYSTEMS AND METHODS FOR DETECTING ISLANDING CONDITIONS IN GRID-TIED INVERTERS

(71) Applicant: ASTEC INTERNATIONAL LIMITED, Kowloon (HK)

(72) Inventors: Vijay Gangadhar Phadke, Pasig (PH); Yancy Fontanilla Boncato, Quezon (PH)

(73) Assignee: ASTEC INTERNATIONAL LIMITED, Kwun Tong, Kowloon (HK)

( * ) Notice: Subject to any disclaimer, the term of this patent is extended or adjusted under 35 U.S.C. 154(b) by 0 days.

(21) Appl. No.: 13/784,365

(22) Filed: Mar. 4, 2013

(65) Prior Publication Data

US 2014/0247632 A1    Sep. 4, 2014

(51) Int. Cl.
  *H02M 3/24* (2006.01)
  *H02M 5/42* (2006.01)
  *H02M 7/44* (2006.01)
  *H02M 7/68* (2006.01)
  *H02M 7/02* (2006.01)
  *H02M 7/5395* (2006.01)
  *H02J 3/38* (2006.01)

(52) U.S. Cl.
  CPC .............. *H02M 7/02* (2013.01); *H02M 7/5395* (2013.01); *H02J 2003/388* (2013.01)

(58) Field of Classification Search
  CPC ..... H02M 7/44; H02M 7/48; H02J 2003/388; G01R 31/00; G01R 31/02; G01R 31/08
  USPC ............. 363/34–41, 55, 56.01, 56.05, 74, 95, 363/109, 116, 120, 121; 323/205–211, 276, 323/277; 702/57–60, 64, 65, 109, 111; 700/286, 292; 307/30–32, 45, 85–87; 361/60–66; 324/512, 527, 528
  See application file for complete search history.

(56) References Cited

U.S. PATENT DOCUMENTS

| | | | |
|---|---|---|---|
| 6,219,623 B1 | 4/2001 | Wills | |
| 6,933,714 B2 * | 8/2005 | Fasshauer et al. | 324/76.21 |
| 7,016,793 B2 | 3/2006 | Ye et al. | |
| 7,138,728 B2 | 11/2006 | LeRow et al. | |
| 7,408,268 B1 | 8/2008 | Nocentini et al. | |
| 7,945,413 B2 | 5/2011 | Krein | |

OTHER PUBLICATIONS

Bower et al.; Evaluation of Islanding Detection Methods for Utility-Interactive Inverters in Photovoltaic Systems; Nov. 2002.

* cited by examiner

*Primary Examiner* — Timothy J Dole
*Assistant Examiner* — Carlos Rivera-Perez
(74) *Attorney, Agent, or Firm* — Harness, Dickey & Pierce, P.L.C.

(57) ABSTRACT

A grid-tie inverter includes a power circuit and a control circuit coupled to the power circuit. The power circuit has an input terminal for coupling to a DC power source and an output terminal for coupling to an AC power grid. The control circuit is configured to perturb an AC output current of the power circuit a first time and detect a first change in an AC output voltage of the power circuit without shutting down the power circuit, perturb the AC output current of the power circuit a second time and detect a second change in the AC output voltage of the power circuit, and shut down the power circuit in response to detecting at least the first change in the AC output voltage and the second change in the AC output voltage. Example embodiments and related methods of controlling grid-tied inverters are also disclosed.

14 Claims, 8 Drawing Sheets

SYSTEMS AND METHODS FOR DETECTING ISLANDING CONDITIONS IN GRID-TIED INVERTERS

FIELD

The present disclosure relates to systems and methods for detecting islanding conditions in grid-tied inverters.

BACKGROUND

This section provides background information related to the present disclosure which is not necessarily prior art.

Electrical inverters are devices that convert direct current (DC) power to alternating current (AC) power. Inverters designed for coupling to an AC power grid are commonly referred to as grid-tie inverters. "Islanding" refers to a condition in which a grid-tied inverter continues to power a location even though power from the electric utility grid is no longer present. Islanding can be dangerous to utility workers, who may not realize a circuit is still powered, and it may prevent automatic re-connection of devices. For these and other reasons, grid-tie inverters typically include control circuits for detecting an islanding condition and disconnecting the inverters from their loads (and the utility grid) upon detecting the islanding condition.

SUMMARY

This section provides a general summary of the disclosure, and is not a comprehensive disclosure of its full scope or all of its features.

According to one aspect of the present disclosure, a grid-tie inverter includes a power circuit and a control circuit coupled to the power circuit. The power circuit has an input terminal for coupling to a DC power source and an output terminal for coupling to an AC power grid. The control circuit is configured to perturb an AC output current of the power circuit a first time and detect a first change in an AC output voltage of the power circuit without shutting down the power circuit, perturb the AC output current of the power circuit a second time and detect a second change in the AC output voltage of the power circuit, and shut down the power circuit in response to detecting at least the first change in the AC output voltage and the second change in the AC output voltage.

According to another aspect of the present disclosure, a method of controlling a grid-tie inverter including a power circuit is disclosed. The method includes perturbing an AC output current of the power circuit a first time, detecting a first change in an AC output voltage of the power circuit without shutting down the power circuit, perturbing the AC output current of the power circuit a second time, detecting a second change in the AC output voltage of the power circuit, and shutting down the power circuit in response to detecting at least the first change in the AC output voltage and the second change in the AC output voltage.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1:
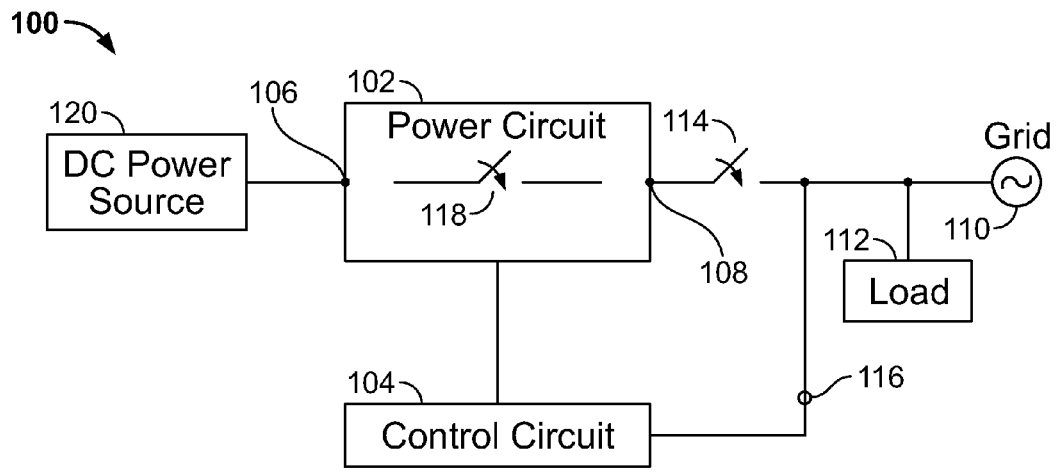
FIG. 1 is a block diagram of an inverter including a control circuit for detecting a change in an AC output voltage indicating an islanding condition according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A grid-tie inverter according to one example embodiment of the present disclosure is illustrated in FIG. 1 and indicated generally by reference number 100. As shown in FIG. 1, the inverter 100 includes a power circuit 102 and a control circuit 104 coupled to the power circuit 102. The power circuit 102 has an input terminal 106 for coupling to a DC power source 120 and an output terminal 108 for coupling an AC power grid 110.

The control circuit 104 perturbs an AC output current of the power circuit 102 and then detects a change in an AC output voltage of the power circuit 102 without shutting down the power circuit 102. The control circuit 104 then perturbs the AC output current again and then detects a change in the AC output voltage again.

In response to detecting the initial change in the AC output voltage and the subsequent change in the AC output voltage, the control circuit 104 shuts down the power circuit 102. Alternatively, more than two changes in the AC output voltage may be detected before shutting down the power circuit 102. For example, in some embodiments, the control circuit 104 may shut down the power circuit 102 after detecting three changes in the AC output voltage, four changes in the AC output voltage, etc.

The detected change in the AC output voltage may be an indication of an islanding condition. In some embodiments, the detected change is an indication of an islanding condition if the detected change is greater than or equal to a defined value of the AC output voltage before this change. The defined value may be about four percent, lower than four percent, higher than four percent, etc. and, in some cases, based on the AC output current perturbation.

Figure 2:
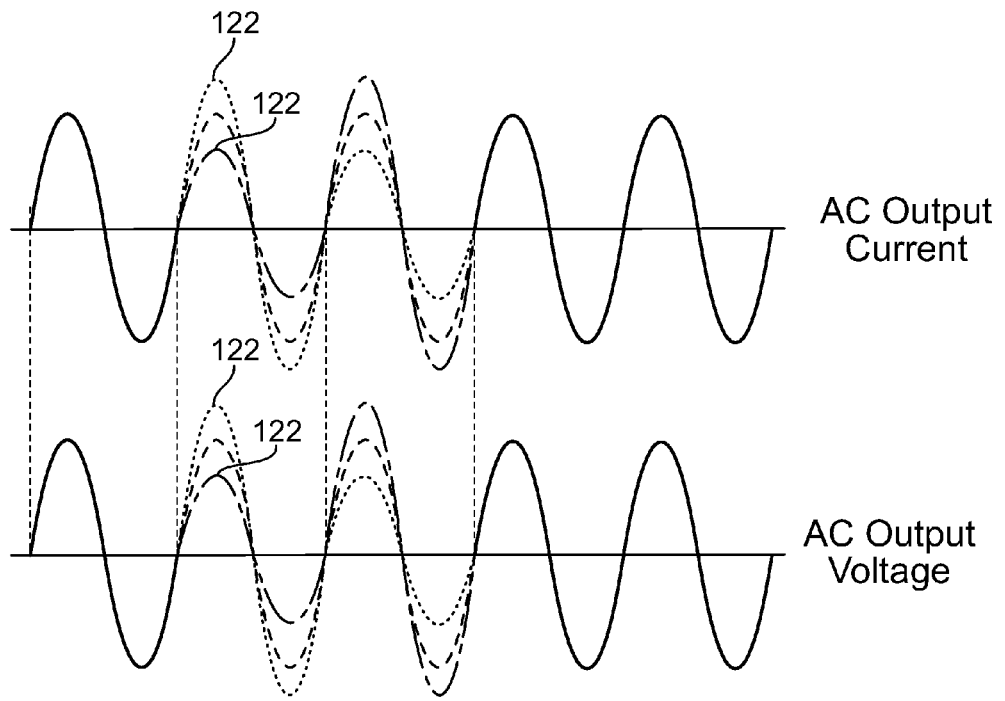
FIG. 2 illustrates example waveforms of an AC output current and an AC output voltage when the load of FIG. 1 is not connected to an AC power grid.

For example, FIG. 2 illustrates example waveforms of a perturbed AC output current and the resulting AC output voltage when the grid 110 is disconnected from the load 112. As shown in FIG. 2, the change in the AC output current produces a directly proportional change in the AC output voltage (indicated by reference number 122). Thus, the change in the AC output voltage (e.g., a change between the AC output voltage prior to perturbing the AC output current and while the AC output current is perturbed) may be larger than the defined value. As explained above, this may indicate an islanding condition.

In other instances, the detected change in the AC output voltage may be a false positive. For example, the detected change in the AC output voltage may not be an islanding condition, but instead may be from grid parameters and/or grid dynamic conditions including, for example, a power line sag (e.g., a brownout, etc.), distortions, etc. In this way, indication of an islanding condition based on one instance of a detected change in the AC output voltage may be unreliable.

Figure 3:
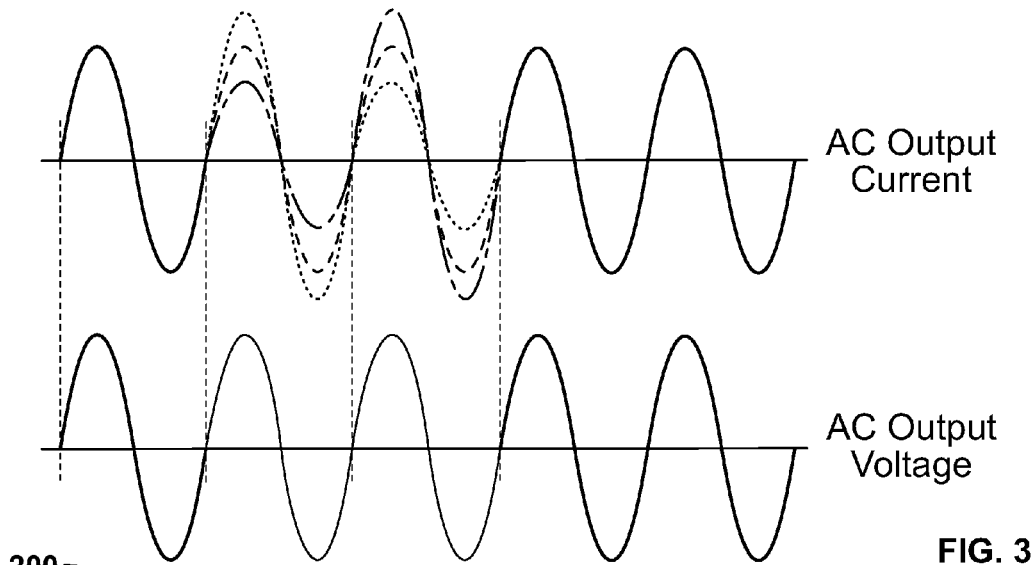
FIG. 3 illustrates example waveforms of an AC output current and an AC output voltage when the load of FIG. 1 is connected to the AC power grid.

For example, FIG. 3 illustrates example waveforms of perturbed AC output current having a minimal effect on the AC output voltage. This may be because the grid 110 (if connected to the load 112) provides enough power to the load 112 to offset the temporary change in power (caused by the current adjustment), multiple inverters are employed to offset the temporary change in power, etc.

Referring back to FIG. 1, to verify the detected change in the AC output voltage is an islanding condition, the control circuit 104 perturbs the AC output current at least one more time and then detects a change in the AC output voltage again. If the subsequent change in the AC output voltage is larger than the defined value, the islanding condition is verified. In this way, the control circuit 104 verifies the initial change in AC output voltage was an islanding condition.

Additionally, although the present disclosure describes verifying the detected change in the AC output voltage once, it should be apparent that this verification may occur more than one time without departing from the scope of the present disclosure.

In the example of FIG. 1, the control circuit 104 may perturb the AC output current of the power circuit 102 the subsequent time only when the initial change in the AC output voltage is greater than or equal to the defined value (as explained above) of the AC output voltage before the initial change. For example, after perturbing the AC output current, the AC output voltage changes from 240 VAC to 220 VAC. This 20 VAC change in AC output voltage is about 8.3% of 240 VAC and is therefore greater than a defined value of four percent. Therefore, in this example, the control circuit 104 would perturb the AC output current of the power circuit 102 the subsequent time.

In response to verifying the islanding condition (e.g., detecting at least one subsequent change in the AC output voltage), the control circuit 104 shuts down the power circuit 102. The power circuit 102 may be shut down in any suitable manner. For example, as shown in FIG. 1, the power circuit 102 may include one or more power switches 118 and the control circuit 104 may provide a signal having a duty cycle to the power switch 118. The control circuit 104 may shut down the power circuit 102 by setting the duty cycle zero.

The perturbation of the AC output current and the subsequent detection of a change in the AC output voltage may be referred to as impedance measurement.

The control circuit 104 may perturb the AC output current by reducing the AC output current or increasing the AC output current. The perturbation may be done, for example, by altering a current reference in the control circuit 102 which in turn changes the AC output current. The perturbation in the AC output current may last for any desired time. For example the perturbation may last for an interval of about one AC cycle, less than one AC cycle, or more than one AC cycle.

The perturbation in the AC output current may cause a similar change in the AC output voltage. The change in the AC output voltage is detected by the control circuit 104 without shutting down the power circuit 102. In some example embodiments, the change in the AC output voltage may be detected within about one AC cycle of when the AC output current is perturbed, including less than one AC cycle, precisely one AC cycle or more than one AC cycle of when the AC output current is perturbed. For this purpose, the AC output voltage may be sampled at a particular instant (such as at a negative peak, positive peak, etc.) during the AC output voltage cycle following the perturbation or, alternatively, by sampling the AC output voltage several times during the AC output voltage cycle following the perturbation and averaging the samples. Regardless of the method employed, the change in the AC output voltage can be compared with value(s) of the AC output voltage prior to the perturbing to detect the change in AC output voltage.

To detect the change, the AC output voltage may be sensed, measured, etc. for the entire duration of the AC output current perturbation or one or more times during this duration. Additionally, the AC output voltage may be sensed, measured, etc. by using any suitable metric, such as a peak voltage, the mean voltage, root mean square (rms), etc.

For example, the control circuit 104 may sense, measure, etc. the AC output voltage prior to perturbing the AC output current and then sense, measure, etc. the AC output voltage again during the AC output current perturbation. The control circuit 104 may then compare the two values to detect a change in the AC output voltage.

In the example of FIG. 1, the power circuit 102 may be coupled to a load 112 via a relay 114. In some embodiments, the control circuit 104 may open the relay 114 in response to the subsequent change in the AC output voltage. In this way, once an islanding condition is verified, the power circuit 102 may be disconnected from the load 112. Alternatively, the relay 114 may open in response to shutting down the power circuit 102 (as explained above). For example, after the power circuit 102 shuts down, AC output power begins to reduce. After one or more parameters (e.g., voltage magnitude, frequency, etc.) of the AC power fall outside of a defined range for operation, the relay 114 may open. Thus, the power circuit 102 may be disconnected from the load 112.

The relay 114 may be any suitable including for example an electromagnetic relay, etc. Additionally, although FIG. 1 illustrates the relay 114 separate from the power circuit 102, the relay may be internal to the power circuit 102.

Additionally, in the example of FIG. 1, the DC power source 120 may include, for example, a distributed generation (DG) source or any other suitable DC power sources. The DG source may include one or more energy sources, including for example solar energy sources, wind energy sources, etc.

Further, in the example of FIG. 1, the inverter 100 is electrically coupled to the AC power grid 110 via relay 114. In this way, the inverter 100 of FIG. 1 is a grid-tied inverter when the relay 114 is closed.

As shown in FIG. 1, the output terminal 108 of the power circuit 102 is coupled to the load 112 (e.g., an office building, a house, etc.) via the relay 114. In this way, the load 112 may receive AC power from the AC power grid 110 and/or the power circuit 102. Although one load 112 is shown in the example of FIG. 1, more than one load may be coupled to the power circuit 102 and/or the grid 110. Additionally, although FIG. 1 illustrates the output terminal 108 coupled to the input side of the relay 114, the output terminal 108 may be coupled on the output side of the relay 114 (e.g., between the sensed parameter 116 of the power circuit 102 and the load 112).

As shown in the example of FIG. 1, the control circuit 104 may sense a parameter 116 of the power circuit 102 to control the power circuit 102, the relay 114, other power converting components (not shown), etc. Additionally, the sensed parameter 116 may assist in detecting the change in AC output voltage that may indicate an islanding condition as explained above. For example, the parameter 116 may be an output voltage, output current, etc. Although only one sensed parameter is shown in the example of FIG. 1, more parameters may be sensed if desired. Additionally, although the parameter 116 is shown being sensed from an output of the power circuit 102, the parameter 116 and/or additional parameters may be sensed from any suitable location.

Figure 4:
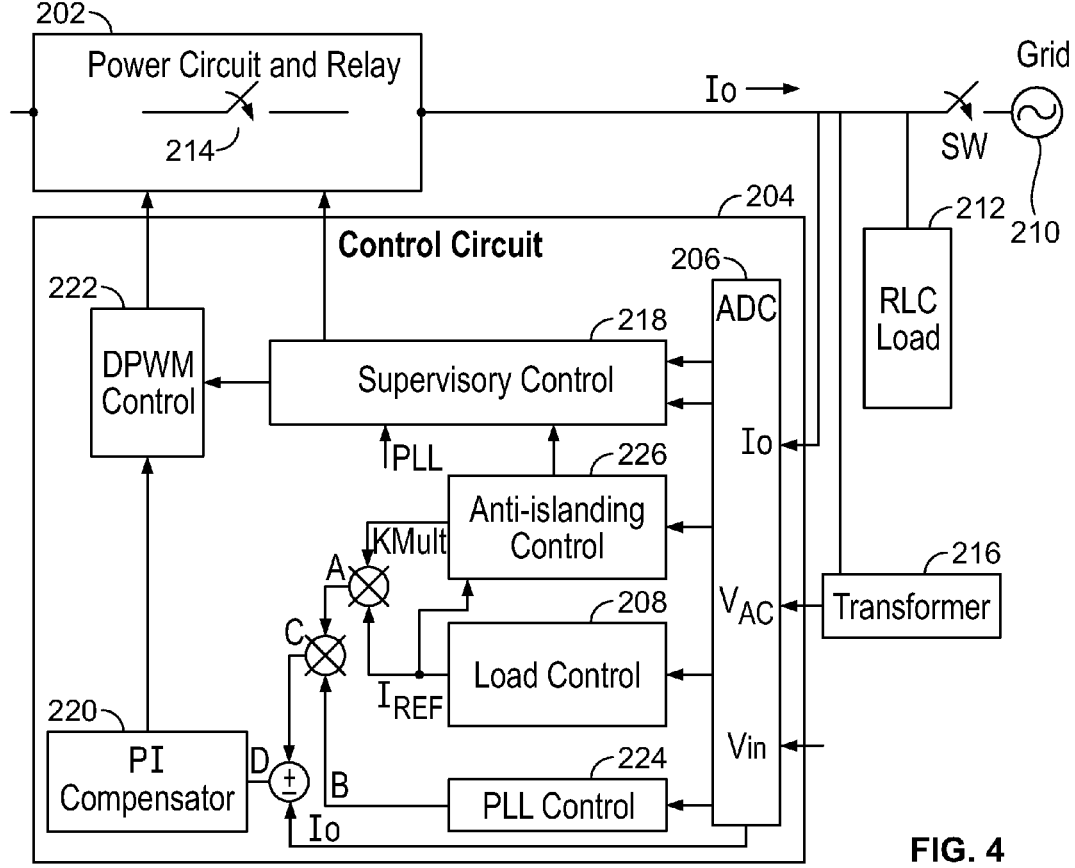
FIG. 4 is a block diagram of an inverter including a control circuit for detecting a change in an AC output voltage indicating an islanding condition according to another example embodiment.

FIG. 4 illustrates an example grid-tie inverter 200 including a power circuit and a relay (collectively referred to as a power circuit 202), and a control circuit 204 coupled to the power circuit 202. An output of the power circuit 202 is coupled to an AC power grid 210 (via a switching device SW) and to a load 212. Although, the example of FIG. 4 illustrates the load 212 as a load including a resistor, an inductor and a capacitor (RLC), any suitable load (or loads) may be coupled to the power circuit 202.

Although the example of FIG. 4 illustrates the relay and the power circuit as one module, it should be apparent to one skilled in the art that the relay and the power circuit may be separate modules without departing from the scope of the disclosure.

In the example of FIG. 4, the control circuit 204 may employ both active methods (e.g., impedance measurement as explained above, etc.) and/or passive methods to detect a possible islanding condition. Preferably, both methods are employed simultaneously (but independently) to detect a possible islanding condition. For example, during an unbalanced load condition, a passive method may detect a possible islanding condition faster than an active method. However, during a balanced load condition, an active method may be employed to detect a possible islanding condition.

The control circuit 204 may employ the same characteristics as the control circuit 104 described above. For example, the control circuit 204 senses the AC output voltage Vac and stores a value representative of the sensed AC output voltage Vac. The control circuit 204 then perturbs the AC output current Io by, for example, changing a current reference (e.g., the DC reference Iref of FIG. 4) of the control circuit 202.

The AC output current Io may be adjusted to any suitable level. In some embodiments, the AC output current Io may be reduced by about twelve percent (12%). In some embodiments, the adjusted value of the AC output current Io may be selected to obtain a desired change in the AC output voltage. Additionally, the adjusted value of the AC output current may change depending on implementation and power of the inverter 200.

While the AC output current Io is perturbed, the AC output voltage Vac may be sensed again. For example, this AC output voltage Vac may be sensed at any point after the AC output current Io is perturbed. Preferably, the AC output voltage Vac is sensed within one AC cycle of when the AC output current Io is perturbed. The control circuit 204 may store another value representative of this sensed AC output voltage Vac.

The two sensed AC output voltages may be compared to determine a change in the AC output voltage Vac. When this change in the AC output voltage Vac exceeds a defined value, an islanding condition may be present (as explained above).

If the AC output voltage Vac indicates an islanding condition, the control circuit 204 may temporarily flag and store the condition. For example, the control circuit 204 may increment a counter (not shown in FIG. 2) to the value of one each time an islanding condition may be present. Alternatively, the counter may be cleared to zero if the change in the AC output voltage Vac does not exceed the defined value.

The control circuit 204 then verifies the detected change in the AC output voltage Vac is an indication of an islanding condition by perturbing the AC output current Io again and detecting another change in the AC output voltage Vac. If the subsequent change in the AC output voltage Vac is larger than the defined value, the islanding condition is verified.

If the subsequent change in the AC output voltage is larger than the defined value, the control circuit 204 may flag the condition and send an appropriate communication to a monitoring and reporting system for the grid 210. Additionally, the control circuit 204 may shut down the power circuit 202 as explained above with reference to FIG. 1. After the power circuit 202 is shut down, the relay may open to disconnect the power circuit 202 from the load 212.

After each AC output current Io perturbation, the control circuit 204 may adjust the AC output current Io back to the original AC output current Io level by changing the DC current reference Iref. Additionally, a current delta representing a magnitude of the perturbed current but in the opposite direction may be added to the DC current reference Iref. The current delta may balance energy in a bulk capacitor (not shown) of the power circuit 202. This current delta may, however, provide a dynamic current to the grid 210 if the switch SW is closed. Alternatively, in some embodiments, the current delta may not be added because the AC output current Io may balance energy in the bulk capacitor after a few AC cycles.

The control circuit 204 may detect the change in the AC output voltage Vac in a polling manner. For example, the control circuit 204 may complete a routine to detect the change in the AC output voltage Vac indicating an islanding condition (e.g., a detection routine) and a routine to detect the subsequent change in the AC output voltage (e.g., a verification routine) in one or more AC cycles.

Each detection routine and/or each verification routine may start at a zero crossing of an AC cycle. For example, the AC output current Io may be perturbed (e.g., by changing the DC current reference Iref) at a zero crossing of the AC output current Io. This may coincide with the DC reference Iref of the inverter 200 being updated every zero crossing of each AC cycle to reduce current distortion of the inverter 200. Thus, when the AC output current Io is perturbed by the DC reference Iref, the resulting change in the AC output current will last one AC cycle. In addition, the resulting change (if any) in AC output voltage will be synchronized with the perturbed AC output current for the one AC cycle. Therefore, detection of this change in the AC output voltage may start at the same zero crossing as when the AC output current Io is perturbed.

Additionally, an interval for each detection routine may be any desired interval. Preferably, this detection routine interval is defined so that the routine has little or no effect on other functions of the power circuit 202 (e.g., maximum power point tracking (MPPT) efficiency, etc.) and/or the inverter 200.

For example, the detection routine interval may be set to a time less than a safety agency required time (e.g., two seconds as defined by IEEE). In some embodiments, the detection routine interval may be set to one fourth (¼) of the safety agency required time, one half (½) of the safety agency required time, etc. This would ensure the detection routine interval may be executed within minimum safety agency required time. Preferably, the detection routine interval is about one second or less to limit the effect of perturbation to other functions of the power circuit 202 and/or the inverter 200.

Alternatively, the detection routine interval may be set by dividing a desired trip time (e.g., the safety agency required time) by the number of desired islanding detections (including verifications). For example, the number of desired islanding detections may be two (as explained above with reference to FIG. 1), three, four, etc.

In other embodiments, the detection routine interval may be a specific number of cycles, half cycles (e.g., 100 half cycles, etc.), etc. For example, at 60 Hz, there are about 119 cycles within the safety agency required time of two seconds. Therefore, the specific number of cycles of each detection routine interval may be about 119 cycles divided by the desired islanding detections (as explained above).

An interval for the verification routine (e.g., subsequently perturbing the AC output current Io and detecting the change in the AC output voltage Vac) may be the same interval as the detection routine interval. Alternatively, this interval may be shorter or longer. For example, this interval may be set to 6 half cycles, 8 half cycles, 10 half cycles, etc.

Figure 5:
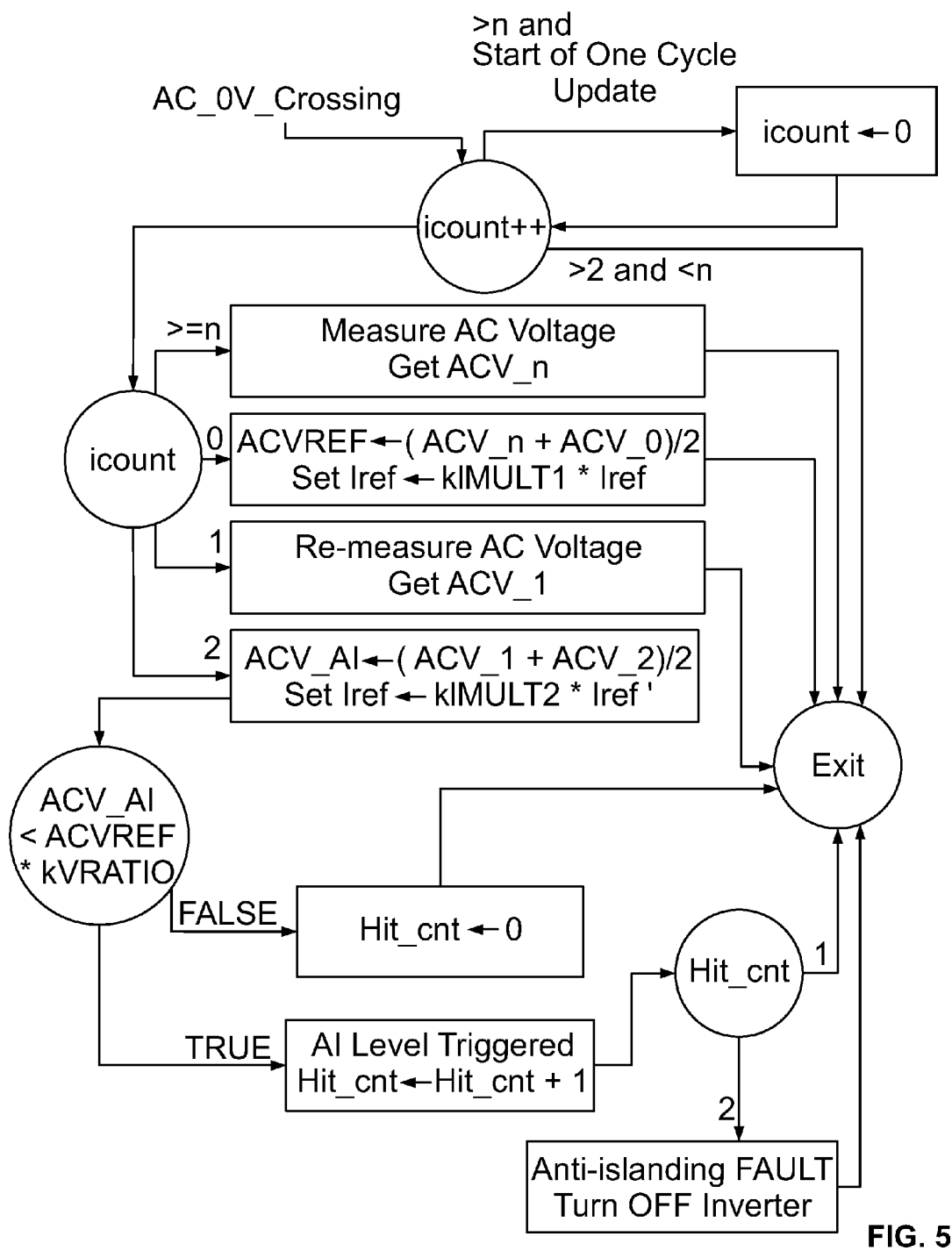
FIG. 5 is a flow diagram illustrating an example routine for detecting a possible islanding condition including a detection routine and a verification routine according to yet another example embodiment.

One example routine including a detection routine and a verification routine as explained above is shown in FIG. 5. The example routine of FIG. 5 is executed every nth half cycle at a zero crossing of a grid voltage. The example routine may be coded into instructions and performed by the control circuits disclosed herein.

Referring back to the example of FIG. 4, the control circuit 204 receives analog signals representative of the sensed AC output voltage Vac, AC output current Io and input voltage Vin. The AC output voltage Vac, the AC output current Io and the input voltage Vin may be sensed, measured, etc. in any suitable manner as further explained above. Preferably, an average of more than one point of the AC voltage waveform and the AC current waveform is employed to measure the AC output voltage Vac and the AC output current Io, respectively. Each signal may be sampled by an analog-to-digital converter (ADC) 206. The digitized signal may then be manipulated through software.

As shown in FIG. 4, a transformer 216 is coupled between the control circuit 204 and the grid 210 to provide isolation between the control circuit 204 and the grid 210. The transformer 216 may be any suitable transformer, including for example a low frequency transformer. Although not shown in FIG. 4, a rectifier may be coupled between the transformer 216 and the control circuit 204. The rectifier may reduce voltage offset due to DC bias from one or more diodes (not shown) of the power circuit 202. In some preferred embodiments, the rectifier may include a precision rectifier (e.g., an operational amplifier and a diode coupled as a half-wave rectifier) to minimize this offset.

In the example of FIG. 4, the control circuit 204 further includes an anti-islanding control 226. The anti-islanding control 226 controls perturbing of the AC output current Io and detecting the change in the AC output voltage Vac as explained above. Additionally, the anti-islanding control 226 generates an output kMult.

The control circuit 204 may synchronize the output of the power circuit 202 with the grid 210. The synchronization, in part, is obtained using a phase locked loop (PLL) control 224. The PLL control 224 generates a sinusoidal output B synchronized with the grid 210. This sinusoidal output B, as further explained below, may be used to generate a sinusoidal current reference C that is proportional to a desired load. The PLL control 224 may be, for example, a software PLL, a DQ PLL, etc. Additionally, the PLL control 224 may also set a frequency used in the control circuit 204. For example, the frequency may be the inverse of the time for the PLL control 224 to complete one AC cycle.

Additionally, the control circuit 204 may control the output of the power circuit 202 in various ways. In the example of FIG. 4, the control circuit 204 includes a load control 208 (coupled to the ADC 206). The load control 208 controls the power circuit 202 by input voltage regulation control. Alternatively, the control circuit 204 may operate in a MPPT load control.

As shown in the example of FIG. 4, the load control 208 generates a DC reference Iref. The load control 208 may update the DC reference Iref (and thus the AC output current Io as explained above) as desired. For example, the load control 208 may update the DC reference Iref as fast as a PWM signal to a switching device (e.g., switching device 214 of the power circuit 202), a multiple of the PWM signal, etc. In other embodiments, the load control 208 may update the DC reference Iref at a modulo of the frequency of the PWM signal. Alternatively, the DC reference Iref may be updated at a slower rate, including every half AC cycle, a single AC cycle, multiple AC cycles, etc., provided a bulk capacitor (not shown in FIG. 4) is large enough to hold sufficient energy.

In some preferred embodiments and as explained above, the load control 208 may update the DC reference Iref at an AC zero crossing so unnecessary dynamics are not introduced. Additionally, to improve harmonics, the single AC cycle update may be used to balance half cycle currents.

As shown in FIG. 4, the control circuit 204 further includes a supervisory control 218 coupled to the ADC 206. The supervisory control 218 receives signals from the PLL control 224, the anti-islanding control 226 and the ADC 206. The supervisory control 218 provides a signal to a DPWM control 222 to disable the one or more PWM signals to shut down the power circuit 202 (as explained above). The supervisory control 218 may also provide a signal to open/close the relay so that the power circuit 202 may be disconnected from or connected to the load 212. Further, the supervisory control 218 may provide under voltage protection, over voltage protection, under frequency protection, over frequency protection, etc.

In the example of FIG. 4, the DC reference Iref of the load control 208 and the output kMult of the anti-islanding control 226 are multiplied to generate an output A. The output A and the sinusoidal output B of the PLL control 224 are then multiplied to generate the sinusoidal current reference C. This sinusoidal current reference C is then compared to the sensed AC output current Io to generate an output D that is applied to a PI compensator 220. The PI compensator 220 provides an output signal to the DPWM control 222. The DPWM control 222 provides one or more PWM signals to the one or more switching devices (e.g., the switching device 214) of the power circuit 202. In this way, the control circuit 204 provides a closed loop, average mode current control for the power circuit 202.

Figure 6A:
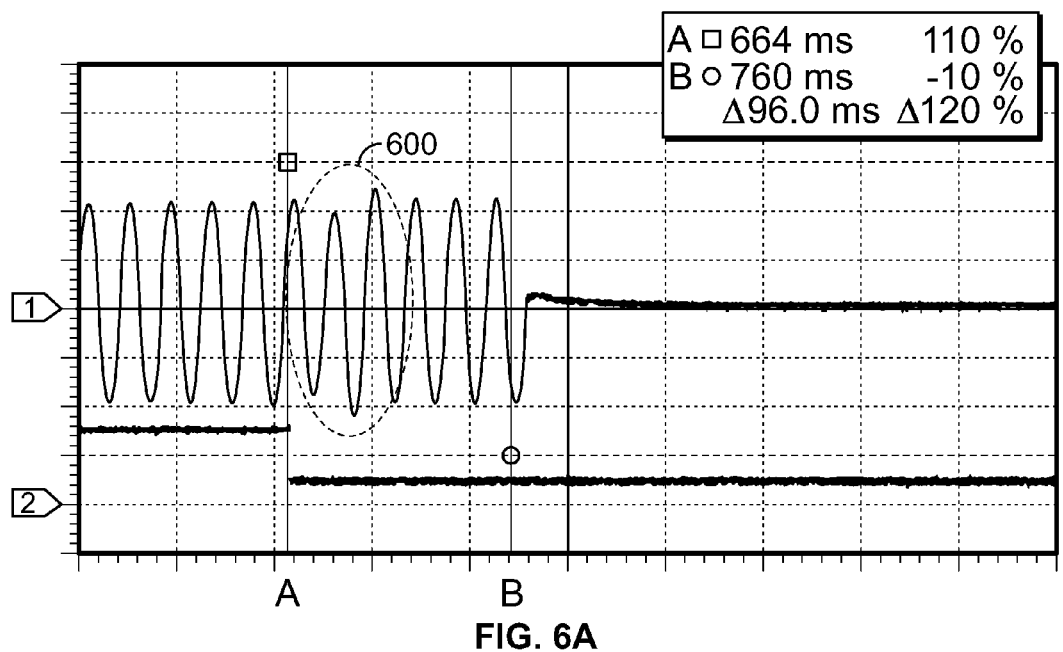
FIGS. 6A, 6B illustrate example waveforms of AC output current from a 3.5 kW inverter having an islanding condition detected by a passive method.
Figure 6B:
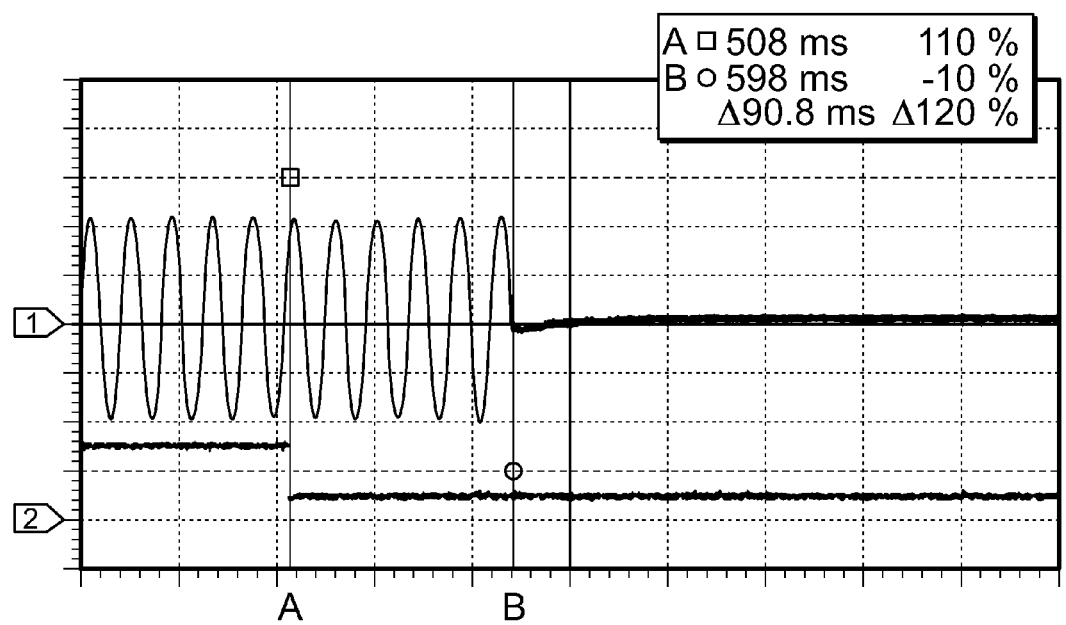

Testing has shown that the control circuits disclosed herein provide islanding condition detection and verification within safety agency required times. For example, FIGS. 6A and 6B illustrate example waveforms of AC output current from a 3.5 kW inverter at 100% load having an unbalanced reactive inductor and capacitor power of −5% (for FIG. 6A) and +5% (for FIG. 6B). The AC output current is supplied to an RLC load. As shown in FIGS. 6A, 6B, point A indicates when the AC power grid is disconnected from the RLC load and point B indicates when the 3.5 kW inverter is disconnected from the RLC load.

As shown in FIG. 6A, an active method of detecting an islanding condition is initiated by perturbing the AC output current (indicated generally by reference number 600). However, because a passive method detects the islanding condition faster in an unbalanced load, the islanding condition is detected first by the passive method of a frequency shift. As shown in FIGS. 6A and 6B, the islanding condition is detected in 96 msec and 90.8 msec, respectively.

Figure 7A:
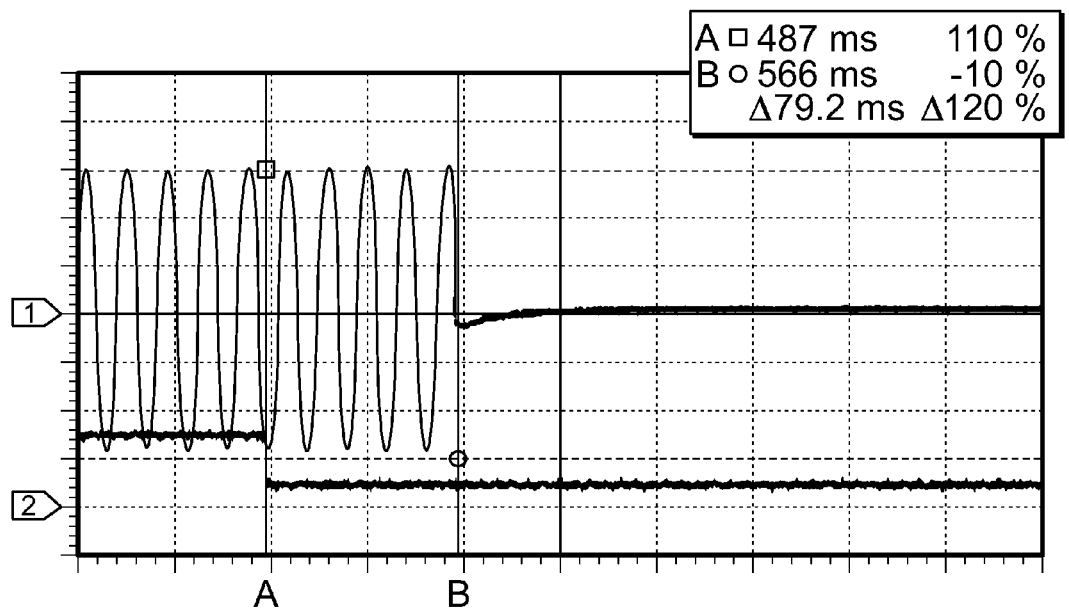
FIGS. 7A and 7B illustrate example waveforms of AC output current from a 5 kW inverter having an islanding condition detected by a passive method.
Figure 7B:
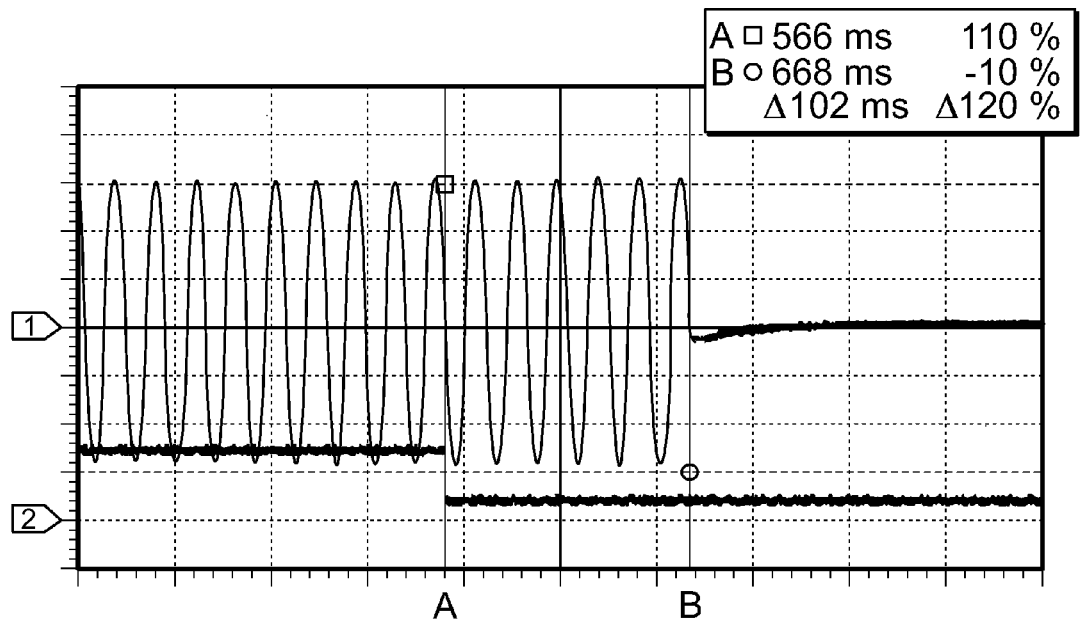

Similarly, FIGS. 7A and 7B illustrate example waveforms of AC output current from a 5 kW inverter at 100% load having an unbalanced reactive inductor and capacitor power of −5% (for FIG. 7A) and +5% (for FIG. 7B). As shown in FIGS. 7A, 7B, point A indicates when the AC power grid is disconnected from the RLC load and point B indicates when the 5 kW inverter is disconnected from the RLC load. An islanding condition is detected by the passive method of a frequency shift (similar to FIGS. 6A, 6B). As shown in FIGS. 7A and 7B, the islanding condition is detected in 79.2 msec and 102 msec, respectively.

In some instances, circumstances may arise that causes an islanding condition to go undetected. The circumstances may include, for example, an inverter coupled to a balanced load while a control circuit controlling the inverter employs a passive mode to detect a possible islanding condition. When instances such as this occur, control circuits may employ the example embodiments disclosed herein to reliably detect and verify islanding conditions.

Figure 8A:
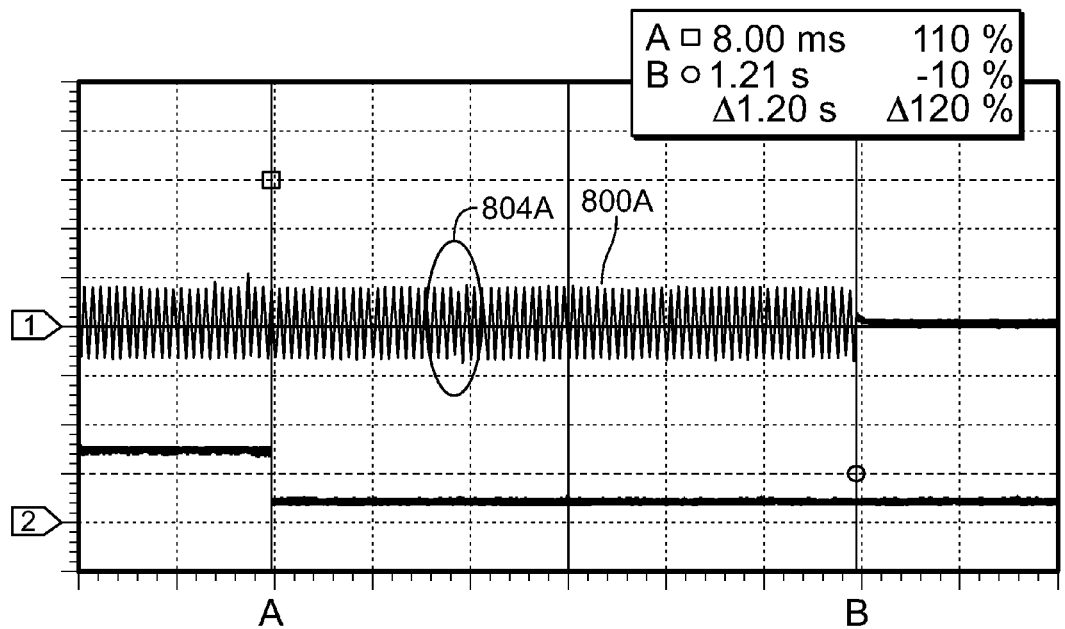
FIGS. 8A-8C illustrate example waveforms of AC output current from a 3.5 kW inverter having an islanding condition detected by an active method.
Figure 8B:
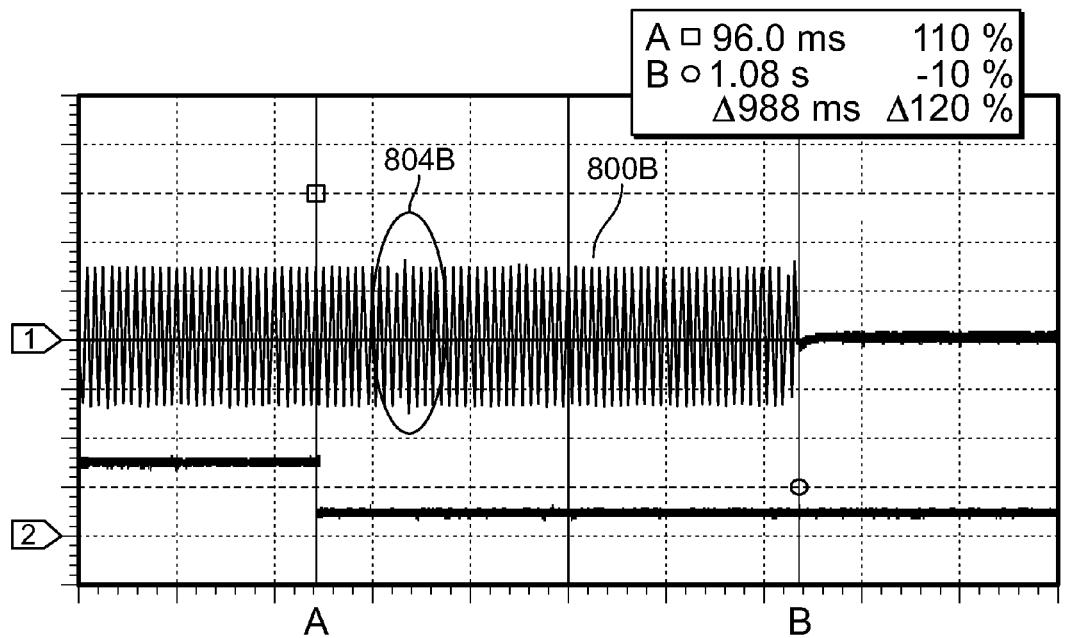
Figure 8C:
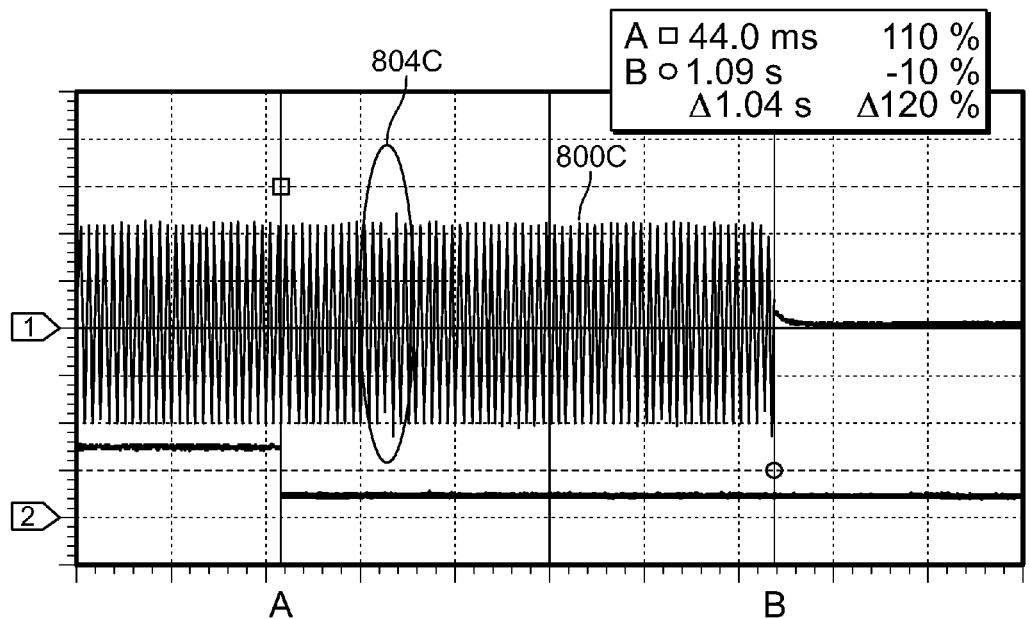

For example, FIGS. 8A, 8B and 8C illustrate example waveforms 800A, 800B, 800C of AC output current from a 3.5 kW inverter having a balanced load at 33%, 66% and 100%, respectively. As shown in FIGS. 8A, 8B, 8C, point A indicates when the AC power grid is disconnected from a RLC load and point B indicates when the 3.5 kW inverter is disconnected from the RLC load.

A control circuit controlling the 3.5 kW inverter perturbs the AC output current and detects the change in the AC output voltage as described above. As shown in FIGS. 8A, 8B and 8C, reference numbers 804A, 804B, 804C generally represent when the AC output current is perturbed. Additionally, as shown in FIGS. 8A, 8B and 8C, the islanding condition is detected in 1.20 sec, 988 msec and 1.04 sec, respectively.

Figure 9A:
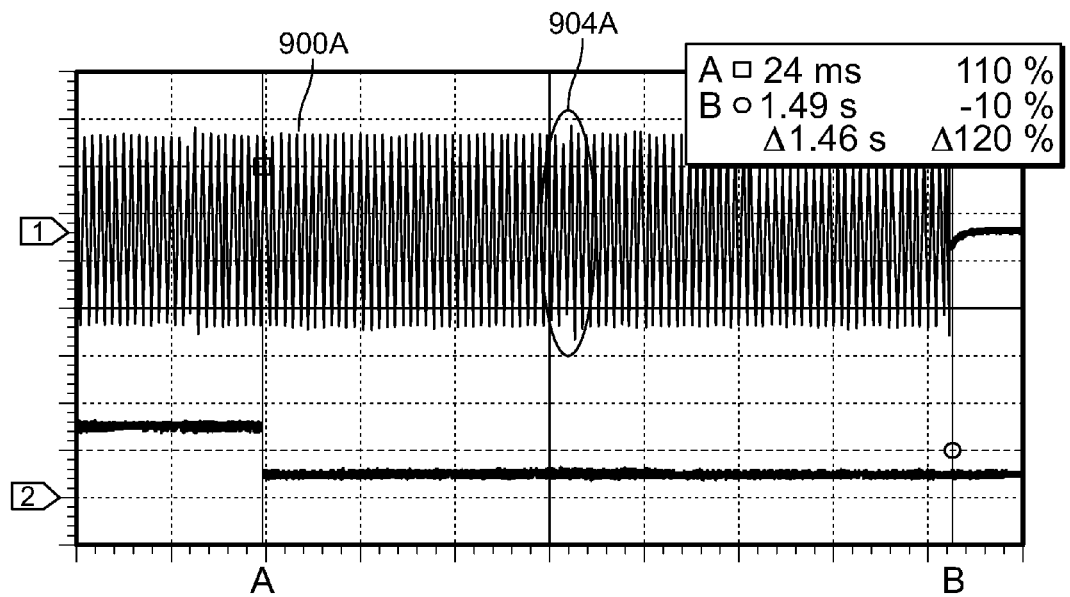
FIGS. 9A-9C illustrate example waveforms of AC output current from a 5 kW inverter having an islanding condition detected by an active method.
Figure 9B:
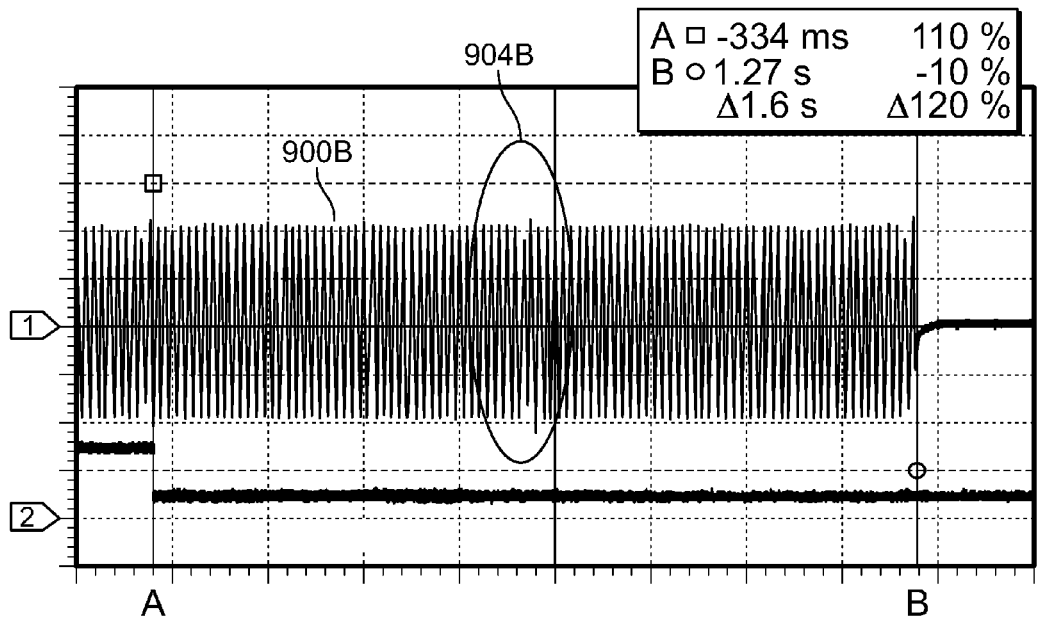
Figure 9C:
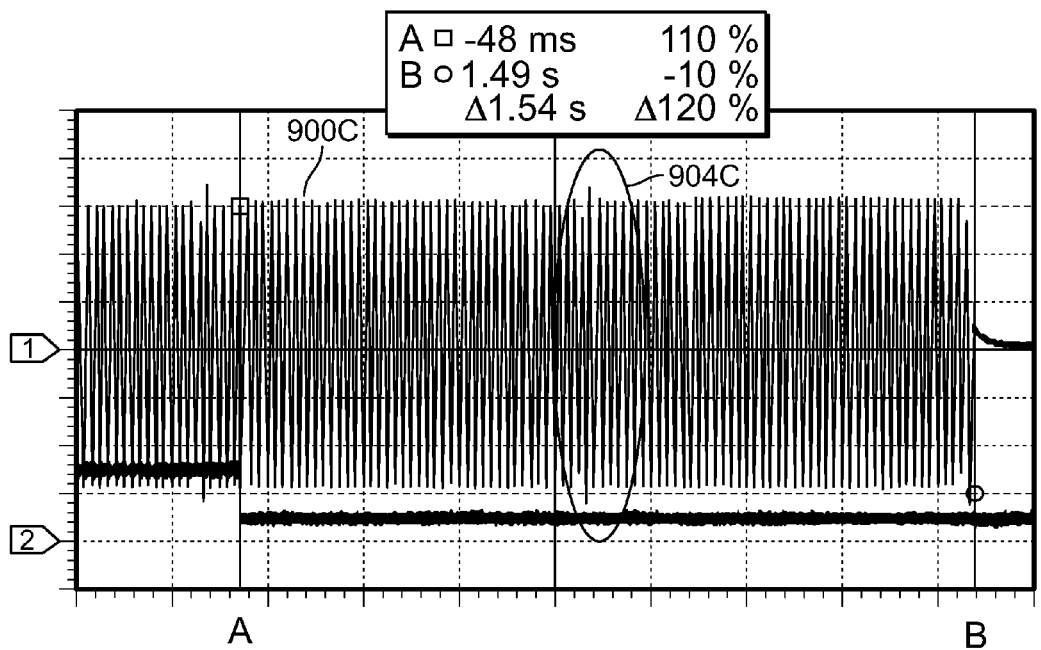

Similarly, FIGS. 9A, 9B and 9C illustrate example waveforms 900A, 900B, 900C of AC output current from a 5 kW inverter having a balanced load at 33% load, 66% load and 100%, respectively. As shown in FIGS. 8A, 8B, 8C, point A indicates when the AC power grid is disconnected from a RLC load and point B indicates when the 3.5 kW inverter is disconnected from the RLC load. Additionally, reference numbers 904A, 904B, 904C generally represent when the AC output current is perturbed. As shown in FIGS. 9A, 9B and 9C, the islanding condition is detected in 1.46 sec, 1.60 sec and 1.54 sec, respectively.

The power circuits described herein may be any suitable inverter capable of converting DC power to AC power. For example, the power circuits may be solar inverters, microinverters, etc. Additionally, the inverters may be coupled to additional power converting components (e.g., a DC-DC converter, etc.) if desired.

The control circuits disclosed herein may include an analog control circuit, a digital control circuit (e.g., a digital signal controller (DSC), a digital signal processor (DSP), etc.), or a hybrid control circuit (e.g., a digital control unit and an analog circuit) to implement the example routines disclosed herein and/or control the inverters disclosed herein.

The control circuits may provide relative ease of implementation while providing a reliable islanding detection and verification system at little to no additional costs. Testing has shown that in non-islanding conditions, no instances of inverter tripping, shutting down, etc. due to the islanding detection and verification system were observed. Additionally, by employing the control circuits to detect and verify islanding conditions, there is little to no impact on total harmonic distortion (THD), harmonics, power factor (PF), MPPT, etc. within a system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A grid-tie inverter comprising:
    a power circuit having an input terminal for coupling to a DC power source and an output terminal for coupling to an AC power grid; and
    a control circuit coupled to the power circuit, the control circuit configured to perturb an AC output current of the power circuit a first time and detect a first change in an AC output voltage of the power circuit without shutting down the power circuit, perturb the AC output current of the power circuit a second time and detect a second change in the AC output voltage of the power circuit, and shut down the power circuit in response to detecting at least the first change in the AC output voltage and the second change in the AC output voltage, wherein the AC output current is perturbed such that the AC output current is decreased and increased in substantially equal magnitudes at least one of the first time and the second time, and wherein the control circuit is further configured to add a current delta after the AC output current is perturbed at least one of the first time and the second time such that the AC output current is decreased and increased in substantially equal magnitudes corresponding to the change in magnitude in the opposite direction when the AC output current is perturbed.

2. The grid-tie inverter of claim 1 wherein the power circuit includes at least one power switch, wherein the control circuit is configured to provide a signal having a duty cycle to the at least one power switch, and wherein the control circuit is configured to shut down the power circuit by setting the duty cycle to zero.

3. The grid-tie inverter of claim 1 wherein the control circuit is configured to detect the first change in the AC output voltage within about one AC cycle of when the AC output current is perturbed the first time.

4. The grid-tie inverter of claim 1 wherein the control circuit is configured to perturb the AC output current at a zero crossing of the AC output current.

5. The grid-tie inverter of claim 1 wherein the control circuit is configured to perturb the AC output current the first time and detect the first change in the AC output voltage within a first interval, wherein the control circuit is configured to perturb the AC output current the second time and detect the second change in the AC output voltage within a second interval, and wherein the second interval is shorter than the first interval.

6. The grid-tie inverter of claim 5 wherein the control circuit is configured to perturb the AC output current the second time only when the first change in the AC output voltage is greater than or equal to about four percent of the AC output voltage before the first change.

7. The grid-tie inverter of claim 1 wherein the control circuit is configured to perturb the AC output current of the power circuit the first time and the second time such that the AC output current is reduced and increased in substantially equal magnitudes.

8. A method of controlling a grid-tied inverter including a power circuit, the method comprising:
    perturbing an AC output current of the power circuit a first time,
    detecting a first change in an AC output voltage of the power circuit without shutting down the power circuit,
    perturbing the AC output current of the power circuit a second time, the AC output current perturbed such that the AC output current is decreased and increased in substantially equal magnitudes at least one of the first time and the second time,
    detecting a second change in the AC output voltage of the power circuit,
    adding a current delta after the AC output current is perturbed at least one of the first time and the second time such that the AC output current is decreased and increased in substantially equal magnitudes corresponding to the change in magnitude in the opposite direction when the AC output current is perturbed, and
    shutting down the power circuit in response to detecting at least the first change in the AC output voltage and the second change in the AC output voltage.

9. The method of claim 8 wherein the power circuit includes at least one power switch and wherein shutting down the power circuit includes setting a duty cycle of a signal to the at least one power switch to zero.

10. The method of claim 8 further comprising in response to shutting down the power circuit, disconnecting the power circuit from a load.

11. The method of claim 8 wherein perturbing the AC output current the second time includes perturbing the AC output current the second time only when the first change in the AC output voltage is greater than or equal to about four percent of the AC output voltage before the first change.

12. The method of claim 8 wherein detecting includes detecting the first change in the AC output voltage within about two seconds of when the AC output current is perturbed the first time.

13. The method of claim 8 wherein detecting includes detecting the first change in the AC output voltage within about one AC cycle of when the AC output current is perturbed the first time.

14. The method of claim 8 wherein perturbing the AC output current of the power circuit the first time and the second time includes perturbing the AC output current such that the AC output current is reduced and increased in substantially equal magnitudes.

* * * * *